United States Patent
Wang et al.

(10) Patent No.: US 9,466,826 B2
(45) Date of Patent: Oct. 11, 2016

(54) METHOD FOR MAKING LITHIUM ION BATTERY ELECTRODE

(75) Inventors: Jia-Ping Wang, Beijing (CN); Ke Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 520 days.

(21) Appl. No.: 13/458,467

(22) Filed: Apr. 27, 2012

(65) Prior Publication Data
US 2013/0168012 A1    Jul. 4, 2013

(30) Foreign Application Priority Data
Dec. 28, 2011   (CN) .......................... 2011 1 0447139

(51) Int. Cl.
| H01M 4/02 | (2006.01) |
| H01M 4/131 | (2010.01) |
| H01M 4/66 | (2006.01) |
| H01M 10/0525 | (2010.01) |

(52) U.S. Cl.
CPC ............. *H01M 4/131* (2013.01); *H01M 4/663* (2013.01); *H01M 10/0525* (2013.01); *Y02E 60/122* (2013.01); *Y02P 70/54* (2015.11); *Y10T 156/10* (2015.01)

(58) Field of Classification Search
CPC ........... H01M 10/0525; H01M 4/663; H01M 4/131; Y02E 60/122
USPC ............................. 156/247, 60; 427/122, 600
See application file for complete search history.

(56) References Cited

U.S. PATENT DOCUMENTS

| 7,826,198 | B2 | 11/2010 | Jiang et al. |
| 8,252,069 | B2 | 8/2012 | Feng et al. |
| 8,262,943 | B2 | 9/2012 | Meng et al. |
| 8,465,871 | B2 | 6/2013 | Juzkow et al. |
| 2002/0106552 | A1 | 8/2002 | Yamaura et al. |
| 2009/0098453 | A1 | 4/2009 | Liu et al. |
| 2009/0098463 | A1* | 4/2009 | Liu et al. ................. 429/231.95 |
| 2009/0317710 | A1* | 12/2009 | Douglas et al. .............. 429/163 |
| 2009/0321688 | A1* | 12/2009 | Saitoh ..................... B82Y 30/00 252/511 |
| 2010/0019209 | A1 | 1/2010 | Meng et al. |
| 2010/0323246 | A1* | 12/2010 | Feng et al. .................... 429/232 |
| 2011/0117433 | A1 | 5/2011 | Sabi et al. |
| 2011/0195311 | A1* | 8/2011 | Kim et al. ................. 429/231.8 |

(Continued)

FOREIGN PATENT DOCUMENTS

| CN | 1466789 | 1/2004 |
| CN | 1588679 | 3/2005 |

(Continued)

OTHER PUBLICATIONS

High-performance supercapacitors using a nanoporous current collector made from super-aligned carbon nanotubes, Ruifeng Zhou et al., Nanotechnolgy, vol. 21, No. 34, p. 1-7.

*Primary Examiner* — Gary Harris
(74) *Attorney, Agent, or Firm* — Zhigang Ma

(57) ABSTRACT

A method for making a lithium ion battery electrode is provided. An electrode material layer including a plurality of electrode active material particles is provided. The electrode material layer includes a surface. A carbon nanotube layer is formed on the surface of the electrode material layer. The carbon nanotube layer consists of carbon nanotubes.

9 Claims, 9 Drawing Sheets

(56) References Cited

U.S. PATENT DOCUMENTS

| | | |
|---|---|---|
| 2011/0212359 A1 | 9/2011 | Dai et al. |
| 2011/0262805 A1 | 10/2011 | Wang et al. |
| 2011/0281143 A1 | 11/2011 | He et al. |
| 2011/0281152 A1 | 11/2011 | He et al. |
| 2012/0295161 A1* | 11/2012 | Wang et al. .................. 429/221 |

FOREIGN PATENT DOCUMENTS

| | | |
|---|---|---|
| CN | 1945881 | 4/2007 |
| CN | 101409337 | 4/2009 |
| CN | 101409338 | 4/2009 |
| CN | 101582302 | 11/2009 |
| CN | 101764213 | 6/2010 |
| CN | 101859892 | 10/2010 |
| CN | 101944639 | 1/2011 |
| CN | 102047488 | 5/2011 |
| CN | 102064337 | 5/2011 |
| CN | 101420021 | 7/2011 |
| CN | 102124599 | 7/2011 |
| TW | 200644319 | 12/2006 |
| TW | 200919811 | 5/2009 |
| TW | 200929292 | 7/2009 |
| TW | 201010940 | 3/2010 |
| TW | M404500 | 5/2011 |
| TW | 201143189 | 12/2011 |
| TW | 201143190 | 12/2011 |

* cited by examiner

METHOD FOR MAKING LITHIUM ION BATTERY ELECTRODE

RELATED APPLICATIONS

This application claims all benefits accruing under 35 U.S.C. §119 from China Patent Application No. 201110446801.7, filed on Dec. 28, 2011, in the China Intellectual Property Office, the disclosure of which is incorporated herein by reference. The application is also related to copending applications entitled, "METHOD FOR MAKING LITHIUM ION BATTERY", filed Apr. 27, 2012 (Ser. No. 13/458,488); "LITHIUM ION BATTERY", filed Apr. 27, 2012 (Ser. No. 13/458,482); "LITHIUM ION BATTERY ELECTRODE", filed Apr. 27, 2012 (Ser. No. 13/458,459); "THIN FILM LITHIUM ION BATTERY", filed May 3, 2012 (Ser. No. 13/463,042); "METHOD FOR MAKING THIN FILM LITHIUM ION BATTERY", filed Apr. 27, 2012 (Ser. No. 13/458,502).

BACKGROUND

1. Technical Field

The present disclosure relates to a method for making lithium ion battery electrodes.

2. Description of Related Art

A lithium ion battery includes a case, an anode, a cathode, a non-aqueous electrolyte, and a separator. The anode and the cathode are both lithium battery electrode. The anode, cathode, non-aqueous electrolyte, and separator are encapsulated in the case. The separator is located between the anode and the cathode. The anode, cathode and separator are infiltrated by the non-aqueous electrolyte. The cathode includes a cathode current collector and a cathode material layer disposed on a surface of the cathode current collector. The anode includes an anode current collector and an anode material layer disposed on a surface of the anode current collector.

The current collector is used to collect the charge generated by the lithium ion battery during discharge, and to connect to an external power source during the recharging of the lithium ion battery. The current collectors are usually made of metal foils, such as copper foil and aluminum foil. However, the metal foils have a relatively large weight. The power density is calculated by power/weight. Therefore, a large weight of the current collector will decrease the power density of a lithium ion battery. Furthermore, the metal foils may be corroded by the electrolyte, which decreases the life span of the lithium ion battery.

What is needed, therefore, is to provide a lithium ion battery electrode having high power density and a long life and a method for making the same.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
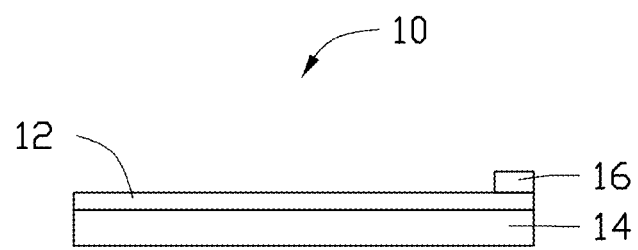
FIG. 1 is a schematic side view of an embodiment of a lithium ion battery electrode.

Referring to FIG. 1, an embodiment of a lithium ion battery electrode 10 includes a current collector 12 and at least one electrode material layer 14 disposed on at least one surface of the current collector 12. The current collector 12 and the at least one electrode material layer 14 can be two separated layers. In one embodiment, the lithium ion battery electrode 10 includes two electrode material layers 14 and one current collector 12 sandwiched between the two electrode material layers 14.

The lithium ion battery electrode 10 can further include a conducting tab 16 electrically connected with the current collector 12. A material of the conducting tab 16 can be metal. After the conducting tab 16 electrically connects with the current collector 12, a protecting layer can be coated on surface of the conducting tab 16 to protect the conducting tab 16 from being corroded by an electrolyte solution. A material of the protecting layer can be polymer. The conducting tab 16 is configured to connect the current collector 12 with outside.

The current collector 12 can be a carbon nanotube layer. The carbon nanotube layer includes a plurality of carbon nanotubes uniformly distributed therein. The carbon nanotubes in the carbon nanotube layer can be combined with each other by van der Waals attractive force therebetween. The carbon nanotubes can be disorderly or orderly arranged in the carbon nanotube layer. The term 'disorderly' describes the carbon nanotubes being arranged along many different directions, such that the number of carbon nanotubes arranged along each different direction can be almost the same (e.g. uniformly disordered), and/or entangled with each other. The term 'orderly' describes the carbon nanotubes being arranged in a consistently systematic manner, e.g., the carbon nanotubes are arranged approximately along a same direction and or have two or more sections within each of which the carbon nanotubes are arranged approximately along a same direction (different sections can have different directions). The carbon nanotubes in the carbon nanotube layer can be single-walled, double-walled, or multi-walled carbon nanotubes. The thickness of the carbon nanotube layer is not limited, and can be in a range from about 0.5 nanometers to about 1 centimeter. In one embodiment, the thickness of the carbon nanotube layer is in a range from about 1 micron to about 1 millimeter. The carbon nanotube layer can include at least one carbon nanotube film. In the carbon nanotube layer, more than one carbon nanotube film can be stacked together.

Figure 2:
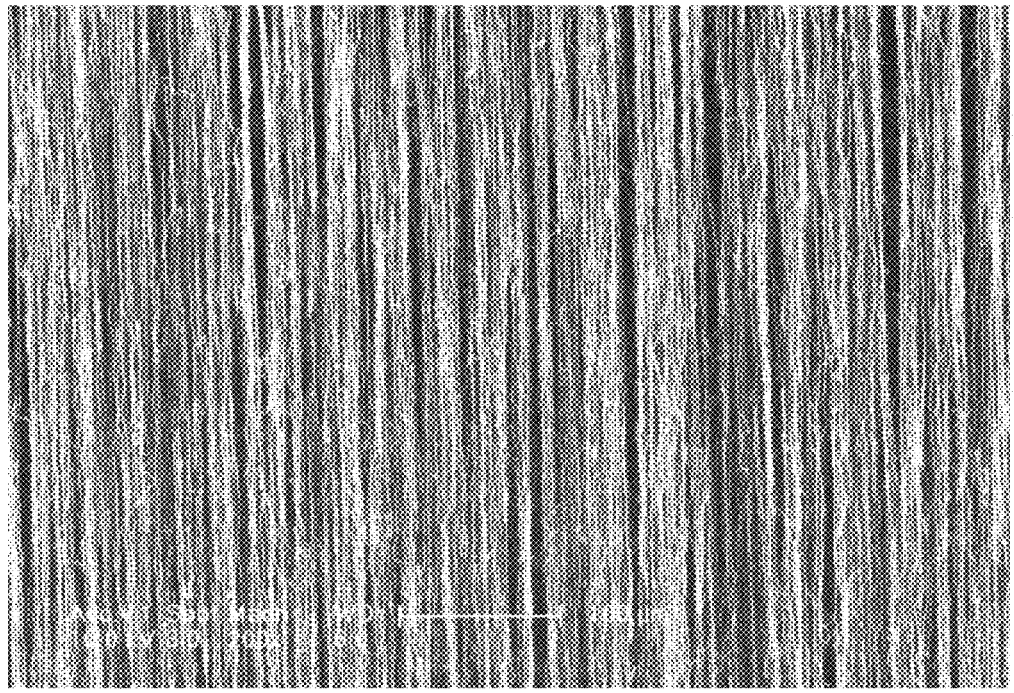
FIG. 2 is a scanning electron microscope (SEM) photo of an embodiment of a drawn carbon nanotube film used in the current collector.

Referring to FIG. 2, in one embodiment, the carbon nanotube layer can include at least one drawn carbon nanotube film. The drawn carbon nanotube film includes a plurality of successive and oriented carbon nanotubes joined end-to-end by van der Waals attractive force therebetween. The carbon nanotubes in the carbon nanotube film can be substantially aligned in a single direction. The drawn carbon nanotube film can be formed by drawing a film from a carbon nanotube array that is capable of having a film drawn therefrom. The plurality of carbon nanotubes in the drawn carbon nanotube film are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. A small number of the carbon nanotubes are randomly arranged in the drawn carbon nanotube film, and has a small if not negligible effect on the larger number of the carbon nanotubes in the drawn carbon nanotube film arranged substantially along the same direction. The drawn carbon nanotube film is capable of forming a free-standing structure. The term "free-standing structure" includes, but not limited to, a structure that does not have to be supported by a substrate. For example, a free-standing structure can sustain the weight of itself when it is hoisted by a portion thereof without any significant damage to its structural integrity. So, if the drawn carbon nanotube film is placed between two separate supporters, a portion of the drawn carbon nanotube film, not in contact with the two supporters, would be suspended between the two supporters and yet maintain film structural integrity. The free-standing structure of the drawn carbon nanotube film is realized by the successive carbon nanotubes joined end to end by van der Waals attractive force.

Some variations can occur in the orientation of the carbon nanotubes in the drawn carbon nanotube film as can be seen in FIG. 2. Microscopically, the carbon nanotubes oriented substantially along the same direction may not be perfectly aligned in a straight line, and some curve portions may exist. It can be understood that a contact between some carbon nanotubes located substantially side by side and oriented along the same direction can not be totally excluded. More specifically, the drawn carbon nanotube film can include a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity and shape. The carbon nanotubes in the drawn carbon nanotube film are also substantially oriented along a preferred orientation. The drawn carbon nanotube film can be a pure structure only including the carbon nanotubes. The thickness of the drawn carbon nanotube film can be in a range from about 0.5 nanometers to about 100 microns. The width and length of the drawn carbon nanotube film is not limited. When the carbon nanotube layer includes a plurality of drawn carbon nanotube films, an angle between the aligned directions of the carbon nanotubes in at least two drawn carbon nanotube films can be in a range from about 0 degrees to about 90 degrees, for example can be equal to about 0 degrees, 15 degrees, 45 degrees, 60 degrees, or 90 degrees.

Figure 3:
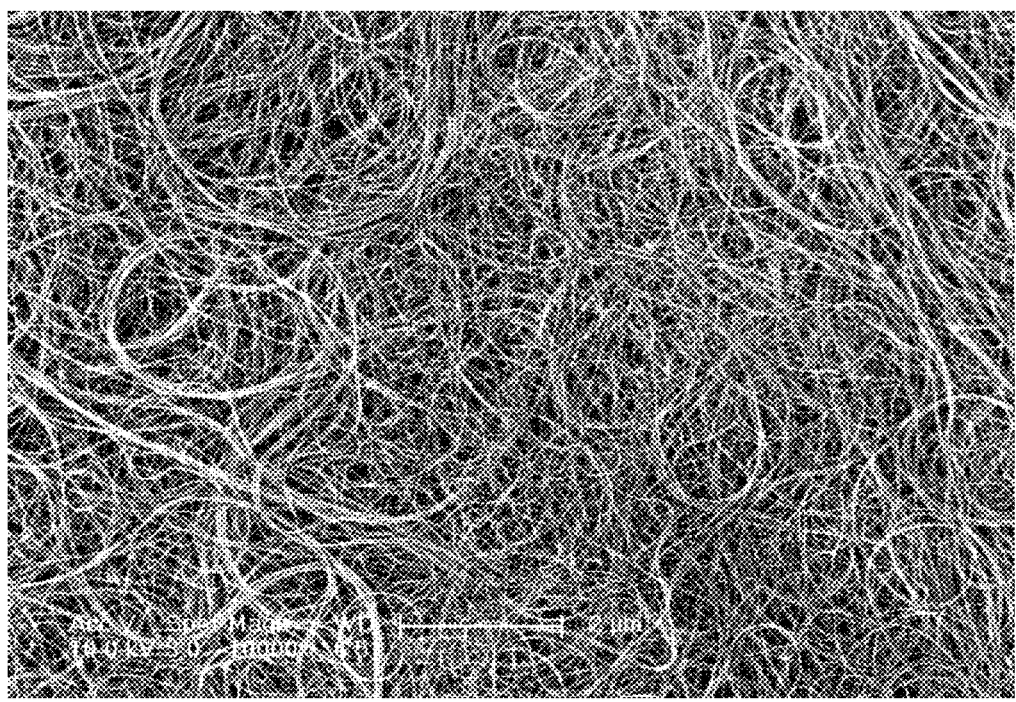
FIG. 3 is an SEM photo of an embodiment of a flocculated carbon nanotube film used in the current collector.

Referring to FIG. 3, in another embodiment, the carbon nanotube layer can include at least one flocculated carbon nanotube film formed by a flocculating method. The flocculated carbon nanotube film can include a plurality of long, curved, disordered carbon nanotubes entangled with each other. The length of the carbon nanotube film can be greater than 10 centimeters. The carbon nanotubes can be randomly arranged and curved in the flocculated carbon nanotube film. The carbon nanotubes can be substantially uniformly distributed in the flocculated carbon nanotube film. The adjacent carbon nanotubes are acted upon by the van der Waals attractive force therebetween, thereby forming an entangled structure with micropores defined therein. Due to the carbon nanotubes in the flocculated carbon nanotube film being entangled with each other, the flocculated carbon nanotube film has excellent durability, and can be fashioned into desired shapes with a low risk to the integrity of flocculated carbon nanotube film. The flocculated carbon nanotube film can be a free-standing structure due to the carbon nanotubes being entangled and adhered together by van der Waals attractive force therebetween. The thickness of the flocculated carbon nanotube film can range from about 1 micron to about 1 millimeter. Many of the embodiments of the carbon nanotube structure are flexible and do not require the use of a structural support to maintain their structural integrity. The flocculated carbon nanotube film can be a pure carbon nanotube film only including carbon nanotubes.

Figure 4:
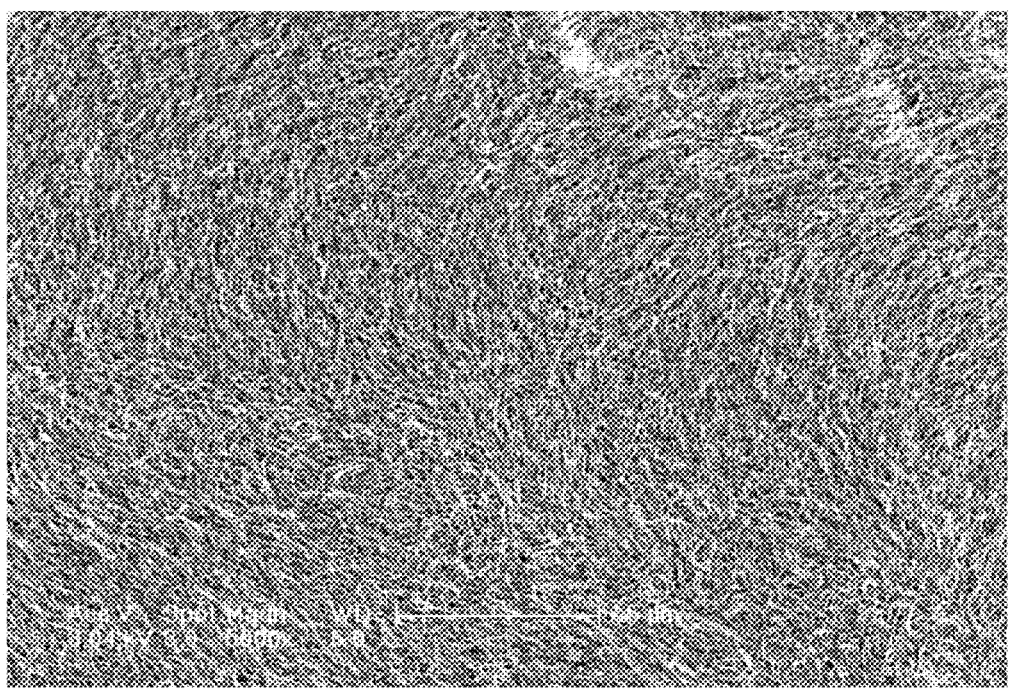
FIG. 4 is an SEM photo of an embodiment of a pressed carbon nanotube film used in the current collector.

Referring to FIG. 4, in further another embodiment, the carbon nanotube layer can include at least one pressed carbon nanotube film. The pressed carbon nanotube film can be formed by pressing a carbon nanotube array to slant the carbon nanotubes in the carbon nanotube array. The pressed carbon nanotube film can be a free-standing carbon nanotube film. The carbon nanotubes in the pressed carbon nanotube film are arranged along a same direction, along more than one predetermined different directions, or randomly arranged. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is about 0 degrees to approximately 15 degrees. In another embodiment, the angle is greater than 0 degrees less than 15 degrees. The greater the pressure applied, the smaller the angle obtained. The thickness of the pressed carbon nanotube film can be in a range from about 1 micron to about 1 millimeter. The pressed carbon nanotube film can be pure carbon nanotube film only including carbon nanotubes. The length and width of the pressed carbon nanotube film depend on the carbon nanotube array that is pressed. If the length and width of the carbon nanotube array is relatively large, the pressed carbon nanotube film can have a relatively large length and width.

Figure 5:
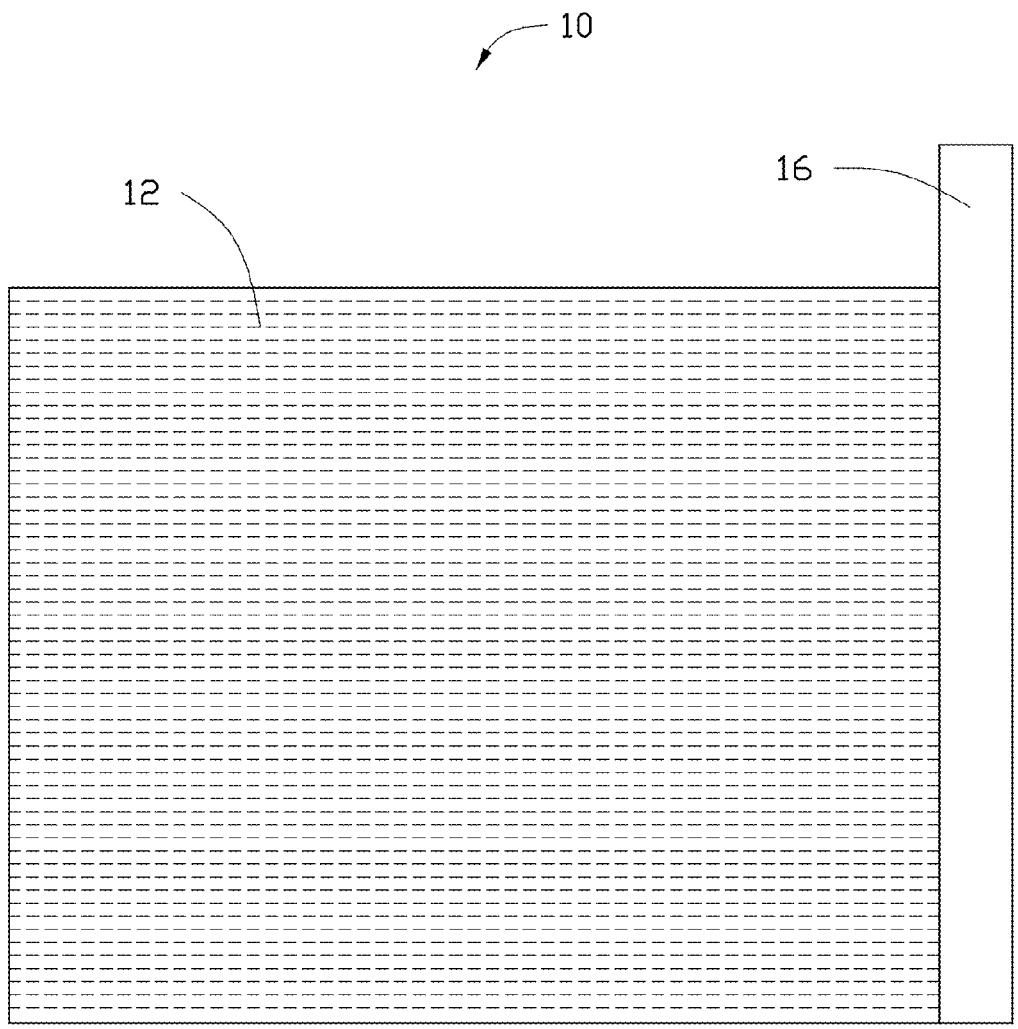
FIG. 5 is a schematic top view of an embodiment of a current collector.

The conducting tab can be electrically connected to the current collector 12 by many methods. Referring to FIG. 5, in one embodiment, the carbon nanotubes in the current collector 12 are aligned along the same direction, the conducting tab 16 can have a strip shape, and the conducting tab 16 can be arranged on the surface of the current collector 12 at one side of the current collector 12. The conducting tab 16 can be overlapped on the side of the current collector 12. The length direction of the strip shaped conducting tab 16 can be substantially perpendicular to the aligned direction of the carbon nanotubes in the current collector 12. The carbon nanotubes have superior conductivity along the axial direction. Therefore, in this arranged manner, the charges in the current collector 12 can be rapidly conducted to the conducting tab 16. The conducting tab 16 can have a line shaped contact and connection area with the current collector 12.

Figure 6:
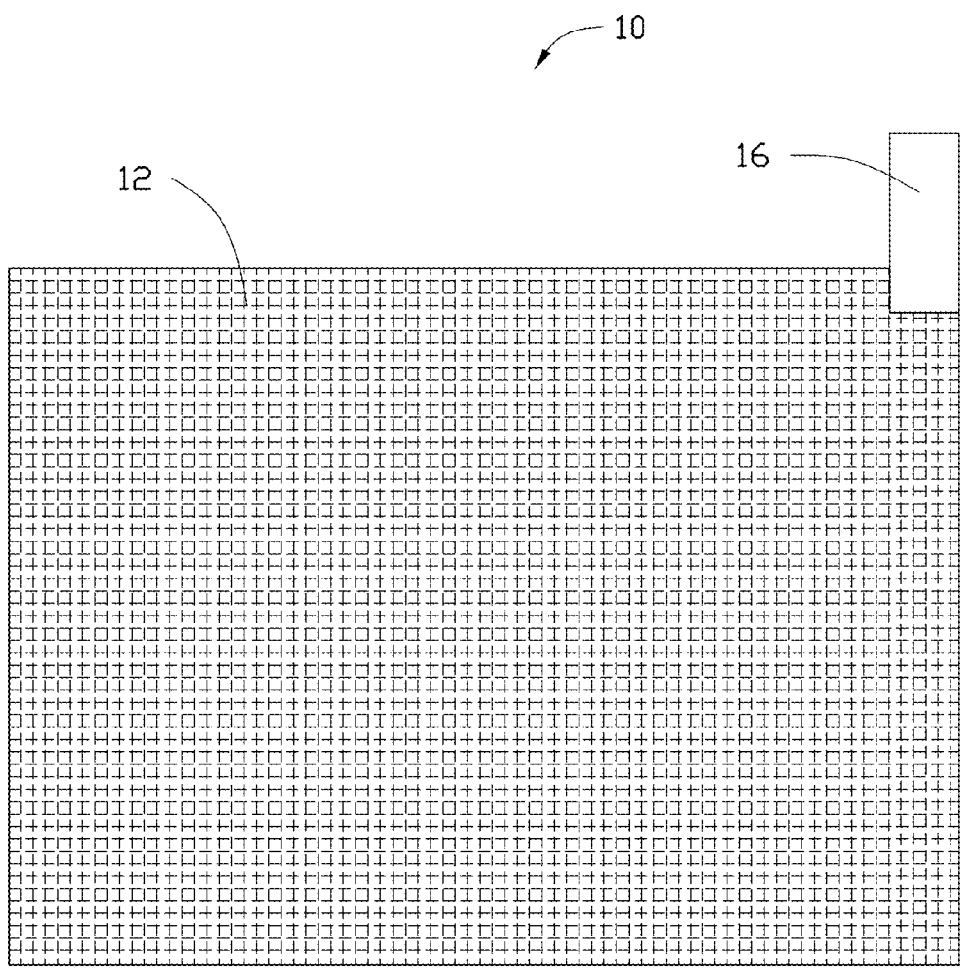
FIG. 6 is a schematic top view of another embodiment of a current collector.

Referring to FIG. 6, in another embodiment, the carbon nanotubes are disorderly arranged or intercrossed with each other in the current collector 12 to form a conducting network. The conducting tab 16 can have a strip shape and only has an end of the strip in contact with the current collector 12. The conducting tab 16 can be electrically connected to the current collector 12 through a point contact. In one embodiment, the current collector 12 includes at least two stacked drawn carbon nanotube films. The carbon nanotubes in the two drawn carbon nanotube films are substantially perpendicular to each other. The carbon nanotubes in the two drawn carbon nanotube films can be substantially parallel to the two substantially perpendicular edges of the current collector 12. The conducting tab 16 can be arranged at the corner of the current collector 12 formed by the two substantially perpendicular edges.

The electrode material layer 14 can include electrode active material, conductive agent, and adhesive. The electrode active material is a cathode active material or an anode active material. If the electrode material is a cathode active material, the electrode 10 is a cathode of a lithium ion battery, which has a thickness of about 10 micrometers to about 500 micrometers, for example 200 micrometers. If the electrode material is anode active material, the electrode 10 is an anode of a lithium ion battery, which has a thickness of about 10 micrometers to about 500 micrometers, for example 100 micrometers. In one embodiment, the electrode 10 is a cathode having a thickness of about 220 micrometers. The cathode active material can be lithium manganate ($LiMn_2O_4$), lithium cobalt oxide ($LiCoO_2$), lithium nickel oxide ($LiNiO_2$), or lithium iron phosphate ($LiFePO_4$). The anode active material can be natural graphite, pyrolysis carbon, or mesocarbon microbeads (MCMB). The conductive agent can be acetylene black, carbon fiber or carbon nanotube. The adhesive can be polyvinylidene fluoride (PVDF) or polytetrafluoroethylene (PTFE).

Figure 7:
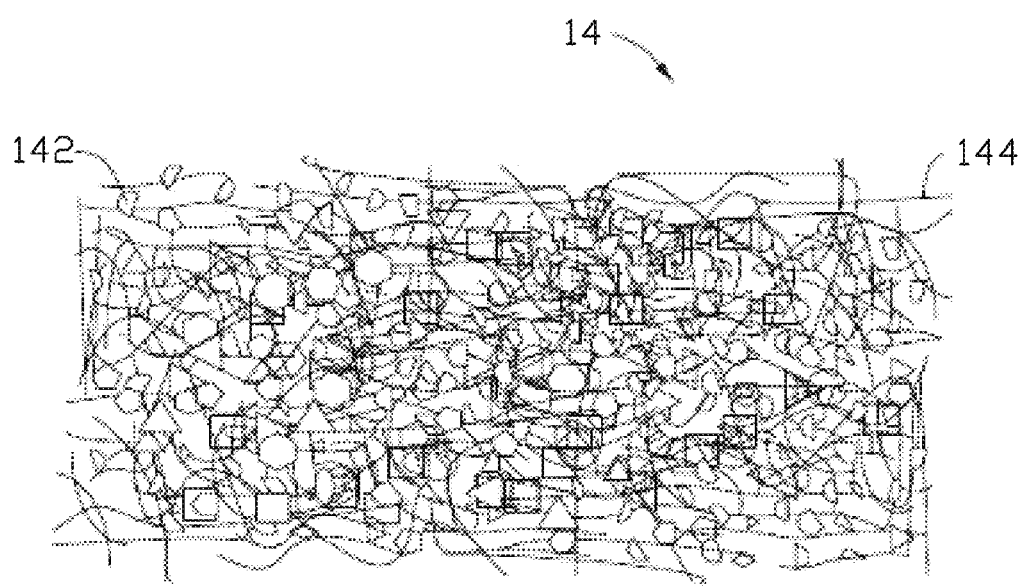
FIG. 7 is a structural schematic view of a lithium ion battery electrode.
Figure 8:
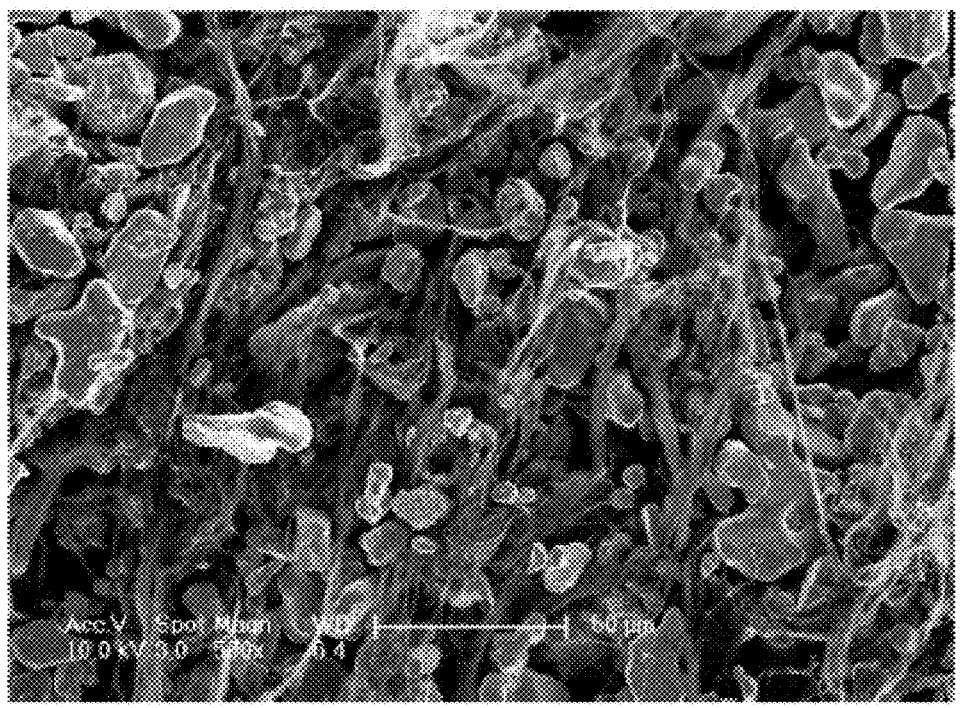
FIG. 8 is an SEM image of one embodiment of a lithium ion battery electrode.

In another embodiment, the electrode material layer 14 consists of the electrode active material and a number of carbon nanotubes, e.g., the electrode material layer 14 is free of adhesive. The electrode material layer 14 can further include acetylene black, carbon fiber, or any other conductive agent. In the embodiment according to FIGS. 7 and 8, the electrode material layer 14 only includes electrode active material particles 142 and carbon nanotubes 144. A shape of the electrode active material particles 142 is not limited, and can be irregular or regular. A diameter of the electrode active material particles 142 is not limited, and can be less than 15 micron. Referring to FIG. 8, in one embodiment, the electrode active material particles 142 can be a cathode active material, the cathode active material is lithium cobalt oxide particles having a diameter less than 15 micron. The carbon nanotubes 144 are entangled with each other and combined by van der Waals attractive force therebetween, thereby forming an integral continuous net structure having a plurality of micropores defined by the carbon nanotubes 144. The plurality of electrode active material particles 142 are dispersed in the net like structure and attached on the surface of the carbon nanotubes 144. The carbon nanotube 144 is pure, and has no impurities adhered thereon. The carbon nanotubes 144 in the lithium ion battery electrode 10 can serve as a conductive material and microporous carrier to support and fix the electrode active material particles 142. Thus, even without using an adhesive, the lithium ion battery electrode 10 can be an integrative stable structure due to the net structure composed of the carbon nanotubes 144. The electrode active material particles 142 are uniformly distributed in the net structure. Specifically, the electrode active material particles 142 can be adhered on or entangled by the carbon nanotubes, or the electrode active material particles 142 can be wrapped by the carbon nanotubes 144. The electrode active material particles 142 and the carbon nanotubes 144 are in contact with each other without adhesive therebetween. The electrode active material particles 142 and the carbon nanotubes are fixed together by van der Waals attractive force therebetween. A length of the carbon nanotubes 144 can be longer than 200 microns, and the carbon nanotubes 144 can be entangled with each other to form the net structure. As such, the electrode active material particles 142 can be fixed by the net structure, and the electrode material layer 14 is free of adhesive.

The carbon nanotube layer used as the current collector 12, the carbon nanotube layer has a relatively good conductivity, stable chemical and electrical stability, and low weight. Therefore, the current collector 12 can have a low weight, and the current collector does not corrode easily, and thus has a relatively long lifespan. As such, the lithium ion battery electrode 10 has a high power density and long lifespan.

Figure 9:
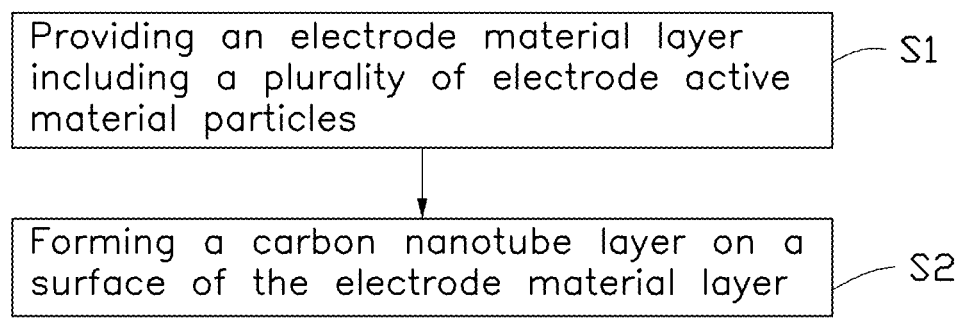
FIG. 9 is a flowchart for making a lithium ion battery electrode according to one embodiment.

Referring to FIG. 9, a method for making a lithium ion battery electrode is provided. The method includes the following steps:

S1: providing an electrode material layer including a number of electrode active material particles; and S2: forming a carbon nanotube layer on a surface of the cathode material layer.

In step S1, a method for making the electrode material layer is not limited. In one embodiment, the electrode material layer is formed by the following steps:

S11: making a carbon nanotube source including a number of carbon nanotubes;

S12: providing an electrode active material including a number of electrode active material particles and a solvent;

S13: adding the carbon nanotube source and the electrode active material into the solvent, and shaking the solvent with the carbon nanotube source and the electrode active material with ultrasonic waves; and S14: separating the carbon nanotube source and the electrode active material from the solvent to obtain the electrode material layer.

In step S11, the carbon nanotube source can be made of carbon nanotubes. The carbon nanotubes can be single-walled carbon nanotubes, double-walled carbon nanotubes, or multi-walled carbon nanotubes. Diameters of the carbon nanotubes can be in a range from about 0.5 nanometers to about 100 nanometers. The carbon nanotubes can be pure, meaning there is few or no impurities adhered on surface of the carbon nanotubes. In some embodiments, there are no functional groups attached on the carbon nanotubes. A length of the carbon nanotubes can be the same or different. The length of the carbon nanotubes can be longer than 300 micrometers. In one embodiment, the lengths of the carbon nanotubes are substantially the same. A method for making the carbon nanotube source can include providing a carbon nanotube array, wherein the carbon nanotube array can be formed on a substrate, and scratching the carbon nanotube array from the substrate to form the carbon nanotube source. The carbon nanotube source obtained directly from the carbon nanotube array can make the lithium ion battery electrode stronger. In one embodiment, the carbon nanotube array is a super aligned carbon nanotube array. A method for making the carbon nanotube array can be CVD method, arc discharge method, aerosol method, or any other appropriate method.

In the step S12, the solvent can be ethanol, glycol, acetone, N-Methyl-2-pyrrolidone, water, or combination thereof. In one embodiment, the solvent is ethanol. The solvent is contained in a container, such as a beaker.

In the step S13, the carbon nanotube source and the electrode active material form a mixture. A weight percentage of the carbon nanotubes in the mixture can be in a range from about 0.1% to about 20%. In some embodiments, the weight percentage of the carbon nanotubes can be in a range from about 1% to about 10%. A power of the ultrasonic wave can be in a range from about 400 W to about 1500 W. In some embodiments, the power is in a range from about 800 W to about 1000 W. A time of shaking using ultrasonic waves can range from about 2 minutes to about 30 minutes. In some embodiments, the shaking time ranges from about 5 minutes to about 10 minutes. The solvent with the carbon nanotube source and the electrode active material can be shaken with ultrasonic waves continuously or at intervals.

In step S14, after the solvent with the carbon nanotube source and the electrode active material is shaken, the carbon nanotubes in the carbon nanotube source and the electrode active material particles in the electrode active material combine with each other to form mixture. The mixture consists of the carbon nanotubes and electrode active material particles. The solvent with the mixture is kept still for about 1 minute to about 20 minutes. The mixture will deposit to a bottom of the solvent. After the solvent with the carbon nanotube source and the electrode active material is shaken, the carbon nanotubes entangle with each other to form a net structure. The electrode active material particles are wrapped by the net structure and attached on the surface of the carbon nanotubes to form an integrity mixture. The electrode active material particles have a larger density than the solvent, and as such, the integrity mixture can be deposited to the bottom of the solvent. After the mixture has deposited to the bottom of the solvent, the solvent can be absorbed from the container by a pipe, thereby separating the mixture from the solvent. After the carbon nanotube source and the electrode active material are separated from the solvent, the mixture of the carbon nanotube source and the electrode active material can be dried at a room temperature or at a temperature from about 25 centigrade to about 80 centigrade. After the mixture is dried, the mixture can be cut directly to form the lithium ion battery electrode. In other embodiments, the mixture can be pressed and then cut to form the lithium ion battery electrode. The electrode material layer made by the above method consists of carbon nanotubes and electrode active material particles.

In step S2, the carbon nanotube layer includes at least one the drawn carbon nanotube film, the flocculated carbon nanotube film and/or the pressed carbon nanotube film. After the drawn carbon nanotube film, the flocculated carbon nanotube film or the pressed carbon nanotube film is formed, it can be laid directly on the surface of the electrode material layer. In one embodiment, the carbon nanotube layer is one pressed carbon nanotube film. The carbon nanotube layer is formed on the surface of the electrode material layer by the following steps: S21: proving a carbon nanotube array; S22: transferring the carbon nanotube array to the surface of the electrode material layer; and S23: pressing the carbon nanotube array.

In step S21, the method for making the carbon nanotube array is nod limited. In one embodiment, the carbon nanotube array is formed on a substrate by CVD method.

In the step S22, the carbon nanotube array is transferred on the surface of the electrode material layer by covering the substrate with the carbon nanotube array on the surface of the electrode material layer, wherein the carbon nanotube array is sandwiched between the substrate and the electrode material layer.

In one embodiment, step S23 includes steps of: applying a pressure on the substrate to press the carbon nanotube array fall onto the surface of the electrode material layer; and removing the substrate from the carbon nanotube array. The substrate can be directly take off from the carbon nanotube array, and at least part of carbon nanotubes in the carbon nanotube array stays on the surface of the electrode material layer to form the first carbon nanotube layer. In other embodiments, the substrate can be removed from the carbon nanotube array by applying a thin sheet between the carbon nanotube array and the substrate, and then the substrate is removed, the carbon nanotube array stays on the surface of the electrode material layer to form the first carbon nanotube layer. After the substrate is removed, the carbon nanotube array staying on the surface of the electrode material layer can be further pressed.

In other embodiments, step S23 includes removing the substrate from the carbon nanotube array and pressing the carbon nanotube array. The substrate can be removed by the method previously disclosed. A method for pressing the carbon nanotube array can be carried out by applying a pressing device on the carbon nanotube array, and pressing the carbon nanotube array with the pressing device. In one embodiment, the pressing device can be a pressure head. The pressure head has a smooth surface. The shape of the pressure head and the pressing direction can determine the direction of the carbon nanotubes arranged therein. When a pressure head (e.g a roller) is used to travel across and press the array of carbon nanotubes along a predetermined single direction, a carbon nanotube layer having a plurality of carbon nanotubes primarily aligned along a same direction is obtained. There may be some variation in the carbon nanotube layer. Different alignments can be achieved by applying the roller in different directions over an array. Variations in the carbon nanotube layer can also occur when the pressure head is used to travel across and press the array of carbon nanotubes several times. The variation will occur in the orientation of the nanotubes. Variations in pressure can also create different angles between the carbon nanotubes and the surface of the carbon nanotube layer. When a planar pressure head is used to press the array of carbon nanotubes along the direction perpendicular to the substrate, a carbon nanotube layer having a plurality of carbon nanotubes isotropically arranged can be obtained. When a roller-shaped pressure head is used to press the array of carbon nanotubes along a certain direction, a carbon nanotube layer having a plurality of carbon nanotubes aligned along the certain direction is obtained. When a roller-shaped pressure head is used to press the array of carbon nanotubes along different directions, a carbon nanotube film having a plurality of sections having carbon nanotubes aligned along different directions is obtained.

In another embodiment, the lithium ion battery electrode can be formed by steps of: providing a sheet structure having a surface; providing a slurry including electrode active material, conductive agent, and adhesive; applying the slurry on the surface of the sheet structure by a coating method or a spinning method; forming the carbon nanotube layer on the electrode material layer; solidifying the slurry; and removing the sheet structure. The sheet structure can be a metal sheet, a glass sheet, or the carbon nanotube layer. If the sheet structure is the carbon nanotube layer, the steps of forming the carbon nanotube layer on the electrode material layer and removing the sheet structure can be omitted.

The method for making the lithium ion battery electrode can further include a step of electrically connecting a conducting tab with the carbon nanotube layer. The conducting tab can be fixed on a surface of the carbon nanotube layer via conductive adhesive.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for making lithium ion battery electrodes comprising:
   providing an electrode material layer consisting of a plurality of electrode active material particles and a plurality of carbon nanotubes, wherein the electrode material layer is a planar structure and comprises a first surface and a second surface opposite to the first surface, the plurality of electrode active material particles is a cathode active material selected from the group consisting of lithium manganate ($LiMn_2O_4$), lithium cobalt oxide ($LiCoO_2$), lithium nickel oxide ($LiNiO_2$), and lithium iron phosphate ($LiFePO_4$), and the electrode material layer is formed by steps of:
   providing a solvent;
   adding the plurality of carbon nanotubes and the plurality of electrode active material particles into the solvent, and agitating the solvent with the plurality of carbon nanotubes and the plurality of electrode active material particles with ultrasonic waves; and
   separating the carbon nanotube source and the plurality of electrode active material particles from the solvent to obtain the electrode material layer; and
   forming a carbon nanotube layer on the first surface of the electrode material layer.

2. The method of claim 1, wherein the carbon nanotube source is made by: providing a substrate and a carbon nanotube array formed on the substrate; and scratching the carbon nanotube array from the substrate to form the carbon nanotube source.

3. The method of claim 1, wherein the solvent is ethanol, glycol, acetone, N-Methyl-2-pyrrolidone, water, or combination thereof.

4. The method of claim 1, wherein the carbon nanotube layer is formed on the first surface of the electrode material layer by:
   providing a carbon nanotube array, the carbon nanotube array comprising the plurality of carbon nanotubes; and
   transferring the carbon nanotube array to the first surface of the electrode material layer; and pressing the carbon nanotube array.

5. The method of claim 4, wherein the carbon nanotube array is transferred on the first surface of the electrode material layer by applying the substrate with the carbon nanotube array on the first surface of the electrode material layer, the carbon nanotube array being sandwiched between the substrate and the electrode material layer.

6. The method of claim 5, further comprising a step of separating the substrate from the carbon nanotube array.

7. The method of claim 6, wherein the substrate is separated from the carbon nanotube array by applying a thin sheet between the carbon nanotube array and the substrate.

8. The method of claim 6, wherein the substrate is directly removed from the carbon nanotube array, and at least a part of the carbon nanotubes of the carbon nanotube array remains on the first surface of the electrode material layer to form the carbon nanotube layer.

9. The method of claim 4, wherein the step of pressing the carbon nanotube array is carried out by: applying a pressing device on the carbon nanotube array; and pressing the carbon nanotube array with the pressing device.

* * * * *